US012027966B2

(12) United States Patent
Yang et al.

(10) Patent No.: US 12,027,966 B2
(45) Date of Patent: Jul. 2, 2024

(54) CONTROL CIRCUIT AND METHOD FOR USE IN STACKABLE MULTIPHASE POWER CONVERTER

(71) Applicant: Richtek Technology Corporation, Zhubei (TW)

(72) Inventors: Ta-Yung Yang, Taoyuan (TW); Wei-Chuan Wu, Hsinchu (TW); Chih-Hao Yang, Tainan (TW); Ping-Ching Huang, Taipei (TW); Li-Wen Fang, Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 192 days.

(21) Appl. No.: 17/892,085

(22) Filed: Aug. 21, 2022

(65) Prior Publication Data

US 2023/0238875 A1   Jul. 27, 2023

Related U.S. Application Data

(60) Provisional application No. 63/302,455, filed on Jan. 24, 2022.

(51) Int. Cl.
*H02M 1/084* (2006.01)
*H02M 1/00* (2006.01)
*H02M 3/158* (2006.01)

(52) U.S. Cl.
CPC ......... *H02M 1/084* (2013.01); *H02M 1/0041* (2021.05); *H02M 1/0043* (2021.05); *H02M 3/158* (2013.01)

(58) Field of Classification Search
CPC .. H02M 1/084; H02M 1/0043; H02M 1/0041; H02M 3/158
See application file for complete search history.

(56) References Cited

U.S. PATENT DOCUMENTS

| | | | |
|---|---|---|---|
| 11,081,954 B2 | 8/2021 | Jiang et al. | |
| 11,349,383 B2* | 5/2022 | Jiang | H02M 3/1584 |
| 11,356,023 B2* | 6/2022 | Jiang | H02M 3/1584 |
| 11,387,736 B2* | 7/2022 | Luo | H02M 1/0003 |
| 2021/0028704 A1 | 1/2021 | Jiang et al. | |
| 2024/0063720 A1* | 2/2024 | Yang | H02M 1/088 |

* cited by examiner

*Primary Examiner* — Adolf D Berhane
(74) *Attorney, Agent, or Firm* — Tung & Associates

(57) ABSTRACT

A control circuit for controlling a stackable multiphase power converter includes: a synchronization terminal; a synchronization signal connected to the synchronization terminals of a plurality of the control circuits in parallel, wherein the synchronization signal includes a plurality of pulses to be successively counted as a count number; and a reset signal, configured to reset and initiate the count number; wherein the control circuit further comprises a phase-sequence number, wherein the control circuit enables a corresponding power stage circuit to generate a phase of the output power when the count number reaches the phase-sequence number.

19 Claims, 16 Drawing Sheets

CONTROL CIRCUIT AND METHOD FOR USE IN STACKABLE MULTIPHASE POWER CONVERTER

CROSS REFERENCE

The present invention claims priority to following provisional applications, Ser. No. 63/302,455, filed on Jan. 24, 2022.

BACKGROUND OF THE INVENTION

Field of Invention

The present invention relates to a stackable multiphase power converter; particularly, it relates to a stackable multiphase power converter. The present invention also relates to a control circuit which is stackable for controlling the stackable multiphase power converter.

Description of Related Art

The stackable multiphase power converter provides high performance DC/DC power conversion for high load current and quick transient response requirements. Therefore, stackable multiphase power converters are widely used for CPU, GPU, AI in high performance computing (HPC) applications. The number of phases of the stackable multiphase power converter is increased when load current is increased. The number of phases is reduced during the light load for power saving.

FIG. 1 shows a prior art stackable multiphase power converter: U.S. Pat. No. 11,081,954 "Phase shedding control method used in multiphase switching converters with daisy chain configuration". The prior art uses a daisy chain configuration for stackable multiphase power converter.

The drawback of the daisy chain configuration shown in the prior art of FIG. 1 is poor fault tolerance. Failure of any one of the control circuits in the daisy chain will cause the whole power converter shutdown.

The present invention provides control circuit for controlling a stackable multiphase power converter with fewer control signals, simpler and more reliable approach then the prior art. The control signals of the present invention are connected to stackable control circuits of the stackable multiphase power converter in parallel without the daisy chain configuration.

SUMMARY OF THE INVENTION

From one perspective, the present invention provides a control circuit for use in controlling a stackable multiphase power converter, wherein the stackable multiphase power converter includes plural power stage circuits and a corresponding number of a plurality of the control circuits, wherein the plural power stage circuits are coupled in parallel to generate an output power to a load, wherein each of the power stage circuits includes at least one switch for controlling an inductor, wherein each of the control circuits is coupled to the corresponding one of the power stage circuits, the control circuit comprising: a synchronization terminal; a synchronization signal, configured to be connected to the synchronization terminals, in parallel, corresponding to the plurality of control circuits, wherein the synchronization signal includes a plurality of pulses to be successively counted as a count number; and a reset signal, configured to reset and initiate the count number; wherein the control circuit further comprises a phase-sequence number, wherein the control circuit enables the corresponding power stage circuit to generate the output power when the count number is correlated to the phase-sequence number.

In one preferred embodiment, the control circuit further comprises a set-terminal for setting the phase-sequence number, wherein the phase-sequence number is determined according to an electrical parameter level on the set-terminal.

In one preferred embodiment, the control circuit further determines to operate as a master circuit or a slave circuit according to the phase-sequence number; wherein the master circuit generates the synchronization signal through the synchronization terminal and the slave circuit is coupled to receive the synchronization signal through the synchronization terminal; wherein the master circuit generates the reset signal, wherein and the slave circuit is coupled to receive the reset signal.

In one preferred embodiment, the control circuit further comprises a counter, configured to successively count the pulses of the synchronization signal to generate the count number; wherein the reset signal is generated when the count number reaches than a maximum number.

In one preferred embodiment, the reset signal is generated when the count number reaches a phase-shed phase number, wherein the phase-shed phase number is increased in response to the increase of the current of the load.

In one preferred embodiment, the control circuit comprises: a sync circuit, configured to operably generate the synchronization signal through the synchronization terminal when the control circuit is configured as the master circuit, and receive the synchronization signal through the synchronization terminal when the control circuit is configured as the slave circuit.

In one preferred embodiment, the control circuit further comprises: a reset terminal, wherein the reset signal is connected to the reset terminals, in parallel, corresponding to the plurality of control circuits; and a reset circuit, configured to operably generate the reset signal through the reset terminal when the control circuit is configured as the master circuit, and receive the reset signal when the control circuit is configured as the slave circuit.

In one preferred embodiment, a pulse width of the reset signal is shorter than a pulse width of the synchronization signal.

In one preferred embodiment, a pulse having a higher voltage level of the synchronization signal represents the reset signal.

In one preferred embodiment, the power stage circuit is a constant on-time (COT) power converter; the COT power converter is triggered on in response to the pulse of the synchronization signal.

In one preferred embodiment, the control circuit further comprises a constant current source which is coupled to a resistor through the set-terminal, wherein the phase-sequence number is determined according to a voltage level of the set-terminal.

In one preferred embodiment, the control circuit is configured as an integrated circuit and the synchronization terminal corresponds to a synchronization pin of the integrated circuit.

From another perspective, the present invention provides a method for controlling a stackable multiphase power converter, wherein the stackable multiphase power converter includes plural power stage circuits and a corresponding number of a plurality of controllers, wherein the plural power stage circuits are coupled in parallel to generate an output power to a load, wherein each of the power stage circuits includes at least one switch for controlling an inductor, wherein each of the controllers is coupled to the corresponding one of the power stage circuits, the method comprising: generating a synchronization signal connected to the controllers of stackable multiphase power converter in parallel without the daisy chain configuration; generating a reset signal in accordance with the synchronization signal; wherein each of the controller includes a phase-sequence number, wherein the synchronization signal includes a plurality of pulses to successively generate a count number, wherein the controller enables the corresponding stackable multiphase power converter to generate the output power to the load when the count number is correlated to the phase-sequence number, wherein the reset signal is coupled to reset and initiate the count number.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
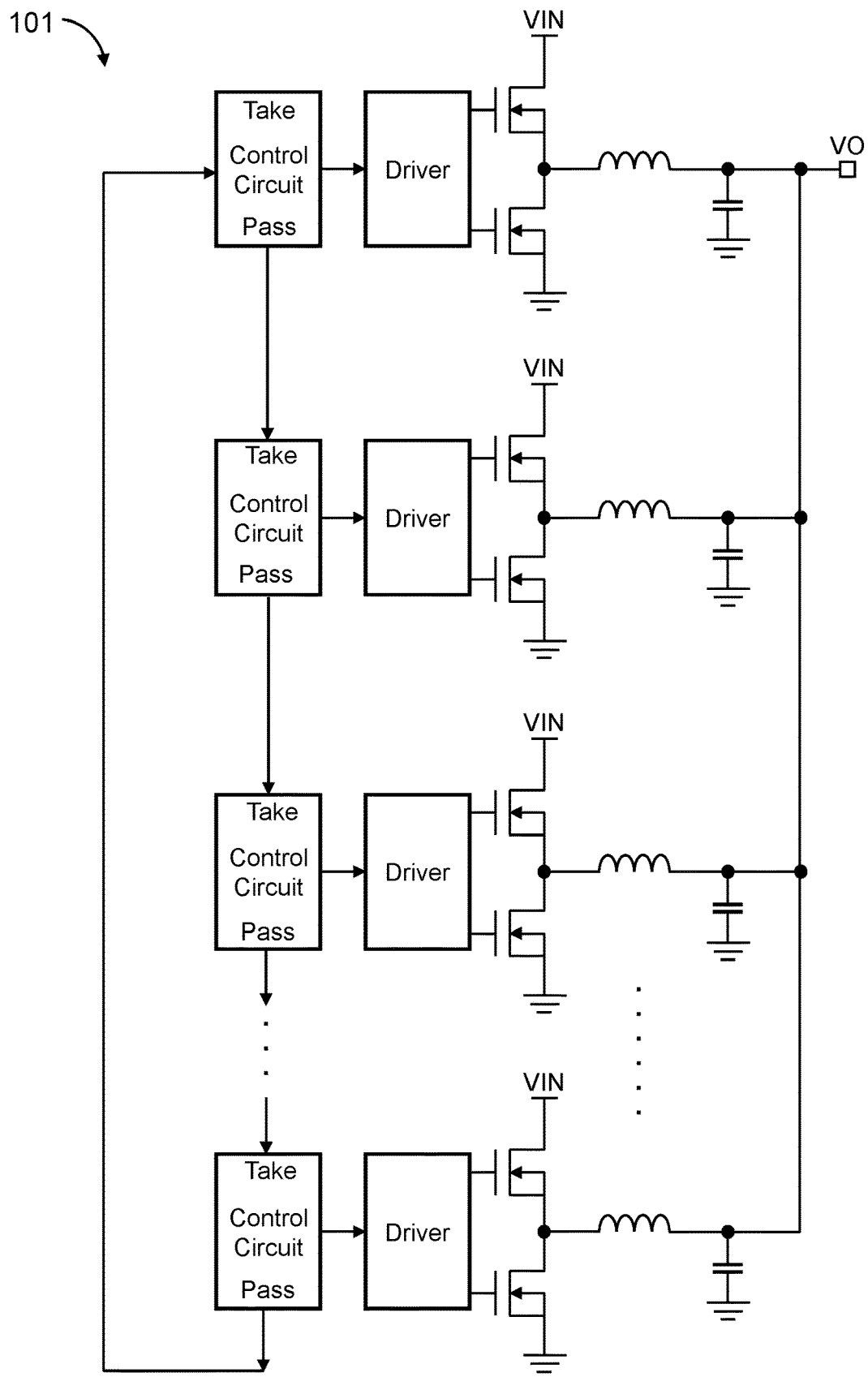
FIG. 1 shows a prior art stackable multiphase power converter.
Figure 2A:
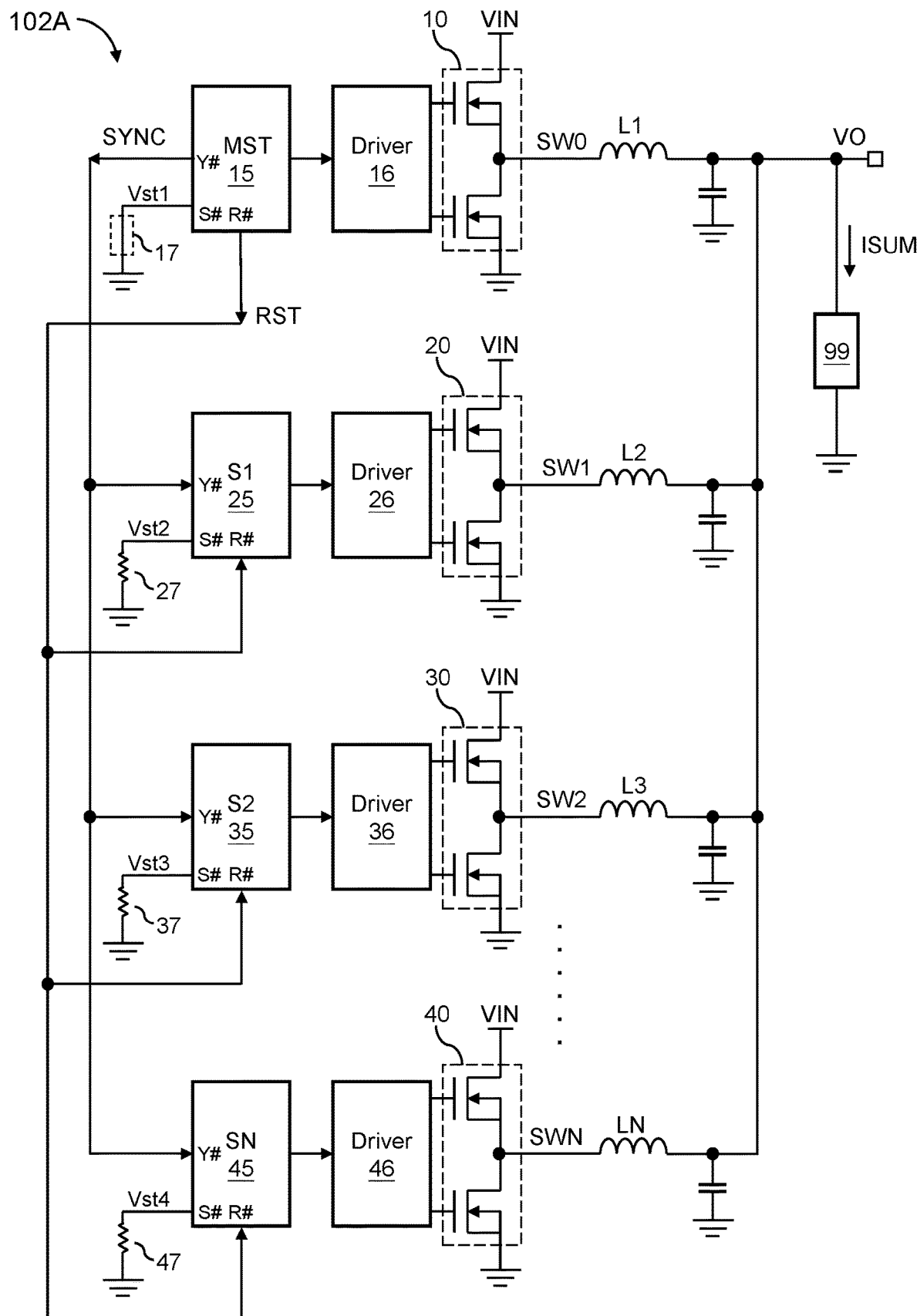
FIG. 2A shows a schematic diagram of one preferred embodiment of the stackable multiphase power converter according to the present invention.

FIG. 2A shows a schematic diagram of one preferred embodiment of the stackable multiphase power converter according to the present invention. The stackable multiphase power converter 102A comprises power stage circuits 10, 20, 30 and 40 which are connected in parallel to generate an output power (e.g. corresponding to the output voltage VO) to a load 99. In one embodiment, the power stage circuits 10, 20, 30 and 40 operate in interleaving phases. More specifically, the power stage circuits 10, 20, 30 and 40 are configured to switch the inductors L1, L2, L3 and LN for interleaving switching power conversion, wherein N is an integer larger than 1.

In one embodiment, the power stage circuit is a buck converter. However, this is not for limiting the scope of the present invention. The power stage circuit can alternatively be other switching power converters such as boost, buck-boost, flyback power converters.

The stackable multiphase power converter further comprises stackable control circuits 15, 25, 35 and 45 which are configured to control switches of corresponding power stage circuits 10, 20, 30 and 40 respectively. In one embodiment, the stackable multiphase power converter further comprises corresponding number of drivers (16, 26, 36, 46), wherein each driver is connected between the corresponding control circuit and the power stage circuit for driving the switches.

In one embodiment, each of the control circuits 15, 25, 35 and 45 is programmable to operate as a master circuit or a slave circuit and the interleaving phase sequence number is also programmable. Still referring to FIG. 2A, in one embodiment, each of the control circuits 15, 25, 35, 45 includes a set-terminal S # for setting the phase-sequence number SET_N. In one embodiment, a resistor collaborating with a constant current source of the control circuit determines the phase-sequence number SET_N for the control circuit. Resistor 17, 27, 37, 47 are connected to the control circuit 15, 25, 35, 45 respectively for the setting of the sequence number SET_N of the corresponding control circuit. The phase-sequence number SET_N is determined according to the voltage level at the set-terminal S #. In one embodiment, the voltage on the set-terminal S # of the control circuit (e.g. Vst1, Vst2, Vst3 and Vst4) is detected to determine the corresponding phase-sequence number SET_N.

In one embodiment, the set-terminal S # of the control circuit 15 is connected to the ground to set its phase-sequence number SET_N as 0 (i.e. the resistor 17 can be omitted as a short circuit). In one embodiment, the phase-sequence number SET_N further determines the control circuit to operate as a master circuit or a slave circuit. In one embodiment, the set-terminal S # of the control circuit 15 is connected to the ground to set its phase-sequence number SET_N as 0 to program the control circuit 15 to operate as master circuit which is noted as MST. In one embodiment, the relationship of the resistance R27, R37, R47 of the resistors 27, 37, 47 is R27<R37<R47, which sets the phase-sequence number SET_N of the control circuit 25, 35, 45 as 1, 2, 3. In one embodiment, the phase-sequence numbers SET_N other than 0 (the master) also determines the control circuits (e.g. 25, 35, 45) as slave circuits (noted as S1, S2 and SN respectively.

Still referring to FIG. 2A, in one embodiment, each of the control circuits 15, 25, 35, 45 includes a synchronization terminal Y #which is configured for transmitting and receiving a synchronization signal SYNC through.

In one embodiment, all the synchronization terminals (i.e. Y #of the control circuits 15, 25, 35 or 45) are connected together, or are connected in parallel in another perspective. In one embodiment, the master circuit (e.g. the control circuit 15) generates and transmits the synchronization signal SYNC through the corresponding synchronization terminal Y. On the other hand, the slave circuit (e.g. the control circuit 25, 35 or 45) is configured to receive the synchronization signal SYNC through the respective corresponding synchronization terminal Y.

Still referring to FIG. 2A, in one embodiment, each of the control circuits 15, 25, 35, 45 includes a reset terminal R #which is configured for transmitting and receiving a reset signal RST through.

In one embodiment, all the reset terminals (i.e. R #of the control circuits 15, 25, 35 or 45) are connected together, or are connected in parallel in another perspective. In one embodiment, the master circuit (e.g. the control circuit 15) generates and transmits the reset signal RST through the corresponding reset terminal R #. On the other hand, the slave circuit (e.g. the control circuit 25, 35 or 45) is configured to receive the reset signal RST through the respective corresponding reset terminal R #.

Figure 2B:
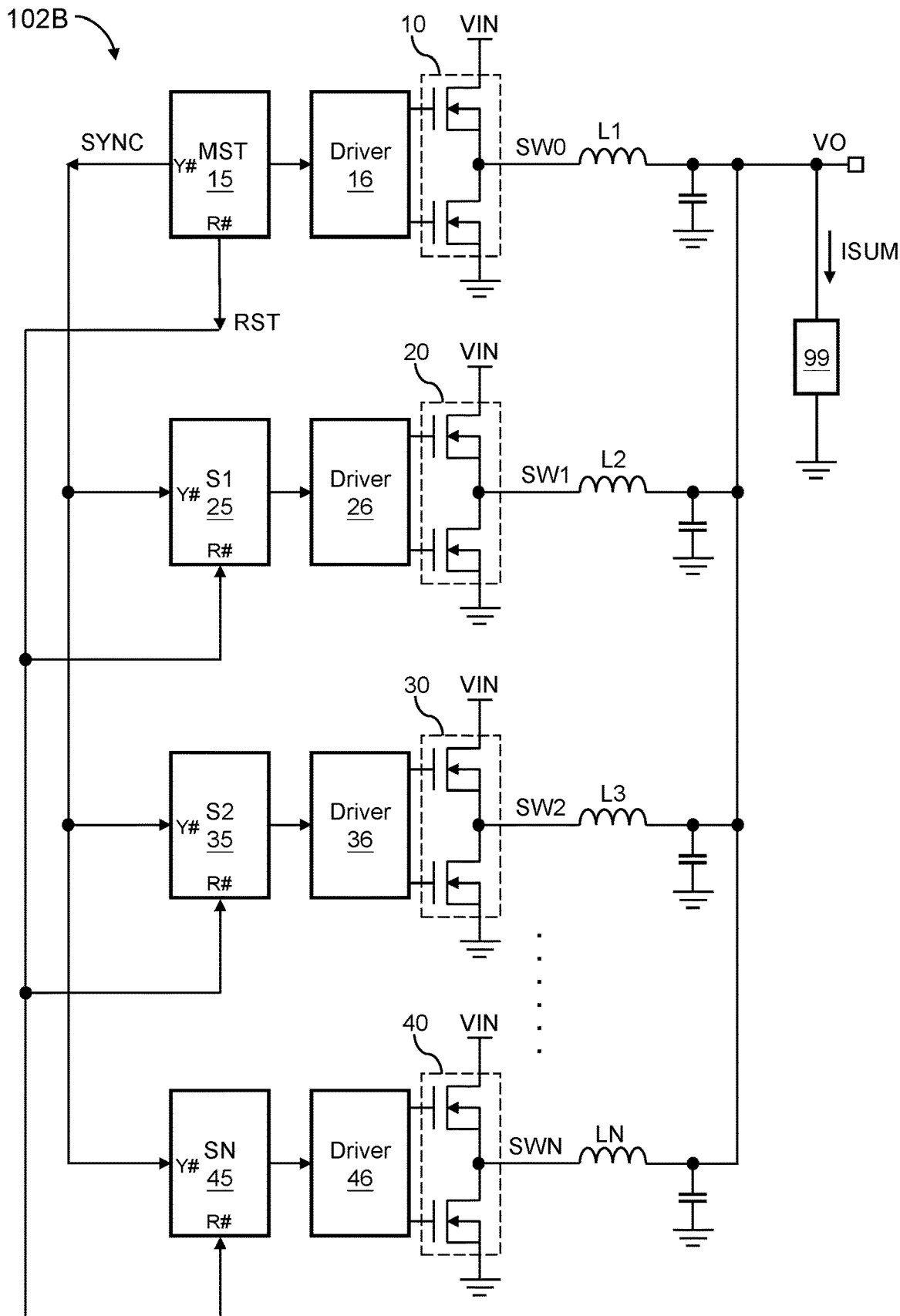
FIG. 2B shows a schematic diagram of another preferred embodiment of the stackable multiphase power converter according to the present invention.

FIG. 2B shows a schematic diagram of another preferred embodiment of the stackable multiphase power converter according to the present invention. The stackable multiphase power converter 102B is similar to the stackable multiphase power converter 102A and differs in that the set-terminal S #of the control circuit in the stackable multiphase power converter 102B is omitted. In this embodiment, the sequence number SET_N can be set by other means, such as preprogramed one-time or multiple time programmable memory circuit, or digital communication interfaces (e.g. I²C).

Figure 2C:
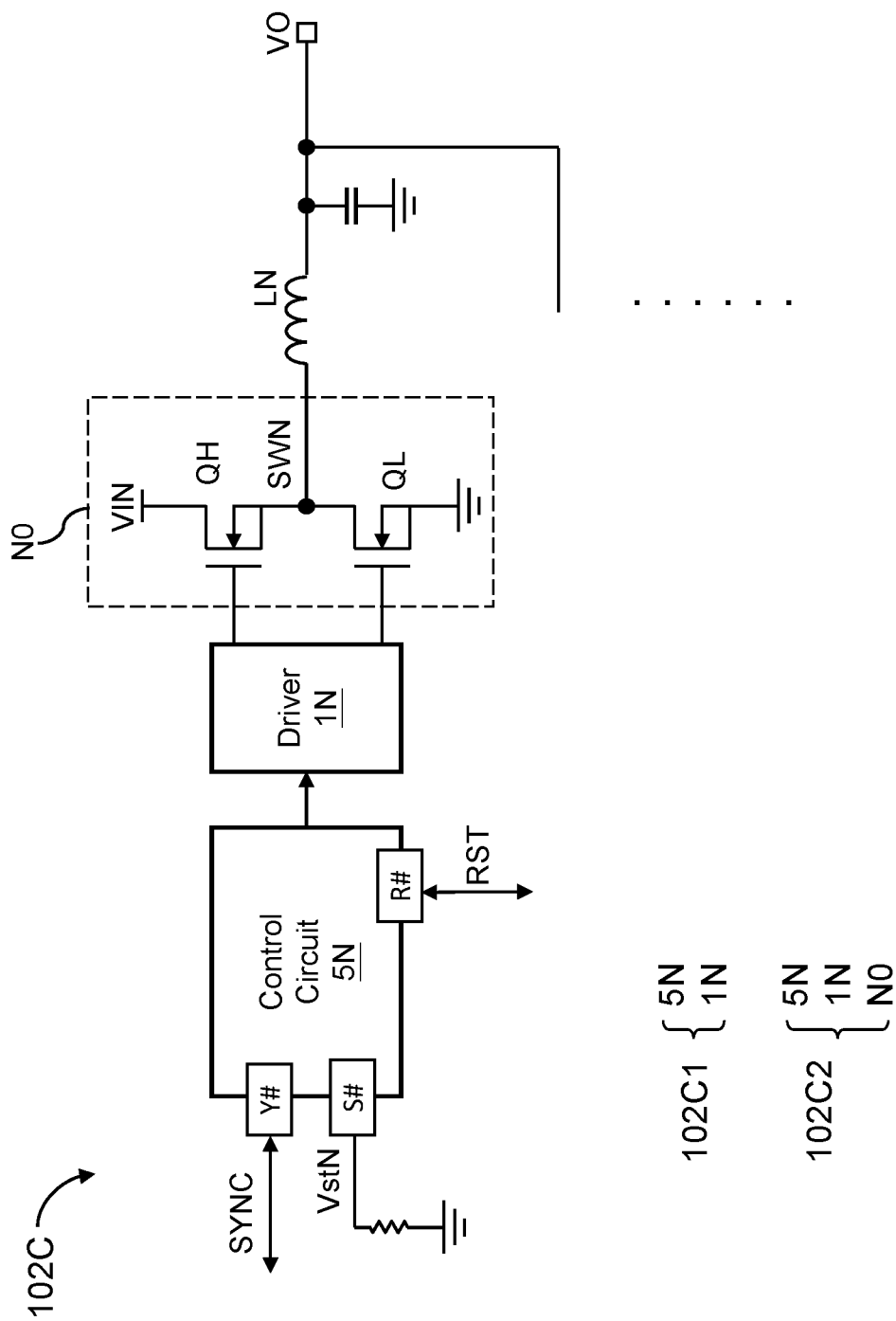
FIG. 2C shows a more specific schematic diagram of a sub-converter of the stackable multiphase power converter.

FIG. 2C shows a more specific schematic diagram of a sub-converter 102C of the stackable multiphase power converter. A sub-converter is in charge of a phase of power delivering of the stackable multiphase power converter. A plurality of the sub-converters are coupled as shown in FIG. 2A to form the stackable multiphase power converter.

In one embodiment, the control circuit (e.g. 5N) is integrated in an integrated circuit. In one embodiment, the control circuit (e.g. 5N) and the driver (e.g. 1N) can be integrated in an integrated circuit (e.g. 102C1). In one embodiment, the control circuit, the driver and the power stage circuit (e.g. NO) can be integrated in an integrated circuit (e.g. 102C2).

Figure 3:
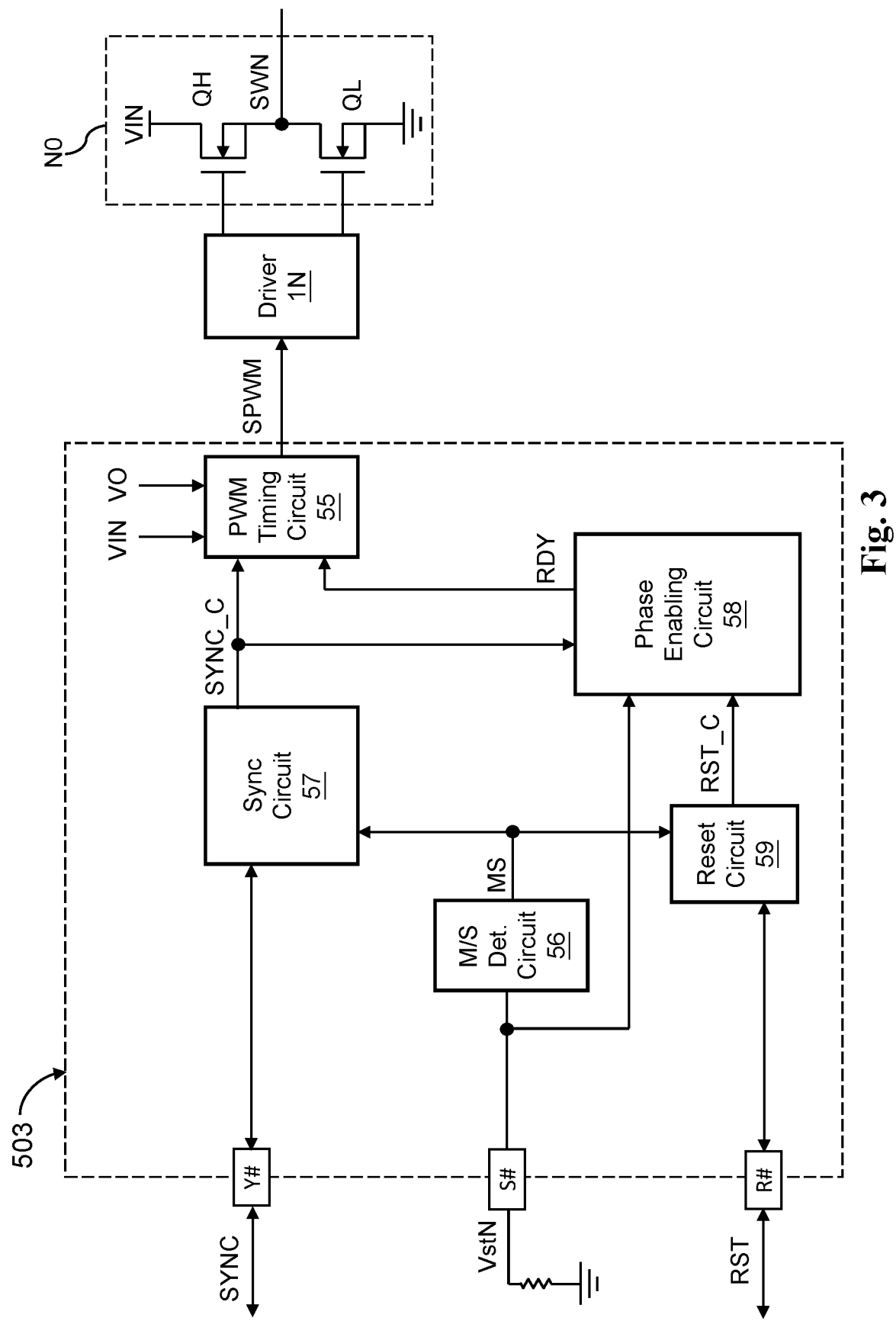
FIG. 3 shows a specific block diagram of the control circuit according to one preferred embodiment (FIG. 2A) of the present invention.

FIG. 3 shows a specific block diagram of the control circuit according to one preferred embodiment (FIG. 2A) of the present invention. In this embodiment, the control circuit 503 includes a master-slave determination circuit (noted as M/S det. circuit 56), a sync circuit 57, a phase enabling circuit 58, a reset circuit 59 and a pulse width modulation (PWM) timing circuit 55.

The M/S det. circuit 56 generates a master signal MS for indicating the control circuit 503 as a master circuit or a slave circuit according to the voltage VstN on the set-terminal S #of the control circuit 503. In one embodiment, the enabling state represents a master circuit. The reset circuit generates a reset control signal RST_C according to the reset signal RST, wherein when the control circuit is configured as a master circuit (e.g. indicated by the enabling state of the master signal MS, the same hereinafter), the reset circuit 59 generates the reset signal RST through the reset terminal R #. When the control circuit 503 is configured as a slave circuit (also indicated by the disabling state of the master signal MS, the same hereinafter), the reset circuit 59 receives the reset signal RST through the reset terminal R #.

The sync circuit 57 generates a sync control signal SYNC_C according to the synchronization signal SYNC. When the control circuit is configured as a master circuit, the sync circuit 57 generates the synchronization signal SYNC through the synchronization terminal Y. When the control circuit 503 is configured as a slave circuit, the sync circuit 57 receives the synchronization signal SYNC through the synchronization terminal Y #.

The phase enabling circuit 58 generates a ready signal RDY according to the reset control signal RST_C, the voltage VstN on the set-terminal S #, the sync control signal SYNC_C and the master signal MS. The PWM timing circuit generates a PWM control signal SPWM according to the sync control signal SYNC_C and the ready signal RDY. Driver 1N drives the high side switch QH and the low side switch QL according to the PWM control signal SPWM.

Figure 4:
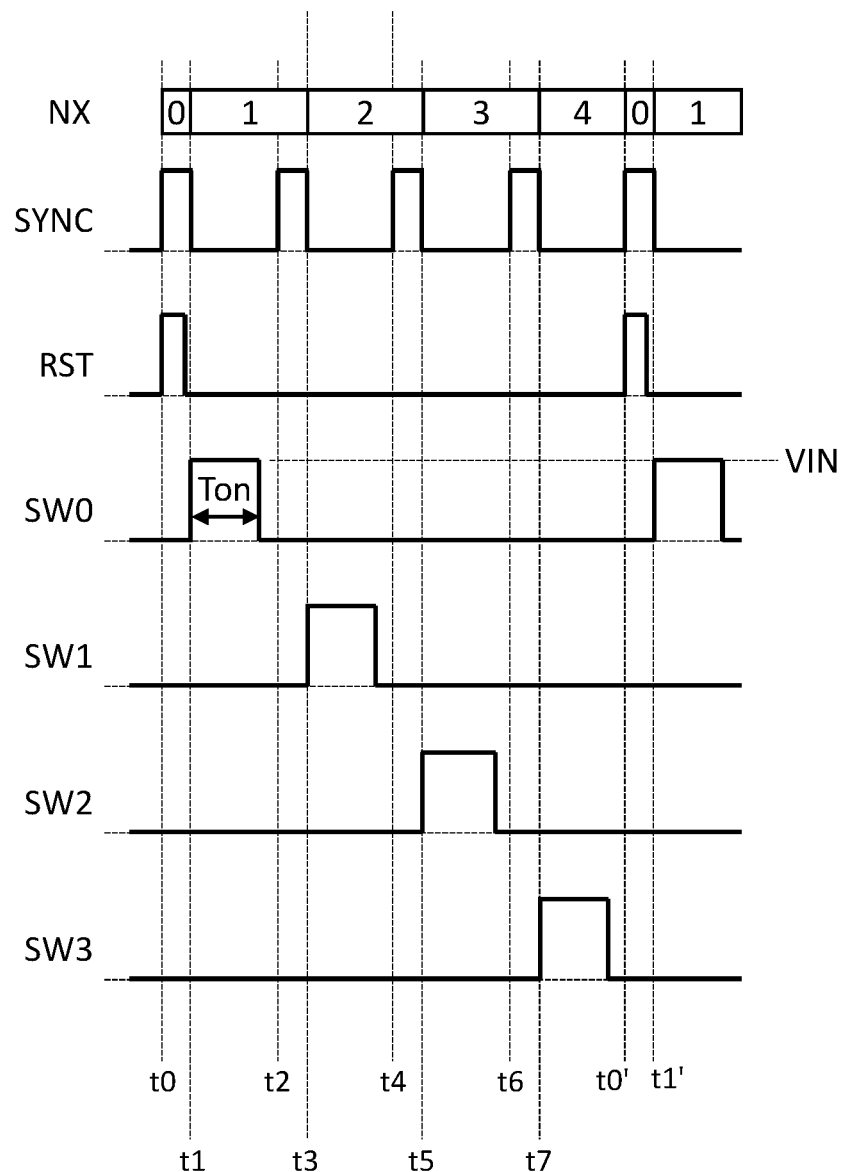
FIG. 4 shows waveforms of the stackable 4-phase power converter shown in FIG. 2A according to the preferred embodiment of the present invention.

FIG. 4 shows waveforms of the stackable 4-phase power converter shown in FIG. 2A according to the preferred embodiment of the present invention. In one embodiment, the synchronization signal SYNC includes a plurality of pulses to successively generate a count number NX in the control circuit. In one embodiment, each control circuit enables the corresponding power stage circuit to generate the output power to the load 99 when the count number NX is correlated to the phase-sequence number SET_N. For example, in one preferred embodiment, each control circuit enables the corresponding power stage circuit to generate the output power to the load 99 when the count number NX is equal to the phase-sequence number SET_N.

In this embodiment, the reset signal RST is configured to reset and initiate the count number NX in every multiphase cycle, which secures a robust configuration of the stackable multiphase power converter according to the present invention.

Still referring to FIG. 4, in one specific embodiment, a ready signal RDY is enabled when the count number NX is correlated to the phase-sequence number SET_N, and the control circuit enables the corresponding power stage circuit to generate the output power to the load 99 when the ready signal RDY is enabled.

In this embodiment, the phase-sequence number SET_N of the control circuits 15, 25, 35, 45 is set as 0, 1, 2, 3 respectively. Still referring to FIG. 4, the operations of the stackable multiphase power converter 102A are explained as below.

t0: The synchronization signal SYNC and the reset signal RST are generated (e.g. by the control circuit 15), the count number NX of each of the control circuits 15, 25, 35, 45 is reset to 0.

t1: Since the count number NX is 0 and is equal to the phase-sequence number SET_N of the control circuits 15, the falling edge of the synchronization signal SYNC triggers the control circuit 15 to enable the power stage circuit 10 to generate the output power to the load 99, for example by controlling the high side switch of the power stage circuit 10 to be conductive such that the switching node SW0 is controlled to VIN for an on time period Ton. Meanwhile, the falling edge of the synchronization signal SYNC increase the count number NX to 1. Note that the on time Ton is determined by the PWM timing circuit 55.

t2: The rising edge of the synchronization signal SYNC latches the status of the ready signal RDY. Because the phase-sequence number SET_N of the control circuit 25 is set as 1, the ready signal RDY of the control 25 is enabled.

t3: The falling edge of the synchronization signal SYNC triggers the control circuit 25 (the count number NX=1) to enable the power stage circuit 20 to generate the output power to the load 99, for example by controlling the high side switch of the power stage circuit 20 to be conductive such that the switching node SW1 is controlled to VIN for an on time period Ton. Meanwhile, the falling edge of the synchronization signal SYNC increase the count number NX to 2.

t4: The rising edge of the synchronization signal SYNC latches the status of the ready signal RDY. Because the phase-sequence number SET_N of the control circuit 35 is set as 2, the ready signal RDY of the control 35 is enabled.

t5: The falling edge of the synchronization signal SYNC triggers the control circuit 35 (the count number NX=2) to enable the power stage circuit 30 to generate the output power to the load 99, for example by controlling the high side switch of the power stage circuit 30 to be conductive such that the switching node SW2 is controlled to VIN for an on time period Ton. Meanwhile, the falling edge of the synchronization signal SYNC increase the count number NX to 3.

t6: The rising edge of the synchronization signal SYNC latches the status of the ready signal RDY. Because the phase-sequence number SET_N of the control circuit 45 is set as 3, the ready signal RDY of the control 45 is enabled.

t7: The falling edge of the synchronization signal SYNC triggers the control circuit 45 (the count number NX=3) to enable the power stage circuit 40 to generate the output power to the load 99, for example by controlling the high side switch of the power stage circuit 40 to be conductive such that the switching node SW3 is controlled to VIN for an on time period Ton. Meanwhile, the falling edge of the synchronization signal SYNC increase the count number NX to 4.

The reset signal RST is generated when the count number NX is equal to or higher than a maximum number. In this embodiment, the maximum number is 4. Therefore, the reset signal RST is triggered to reset the counter at the rising edge of the synchronization signal SYNC when the count number NX is 4 (e.g. at t0').

In one embodiment, although the synchronization signal SYNC and the reset signal RST are generated simultaneously, the pulse width of the reset signal RST is shorter then pulse width of the synchronization signal SYNC.

In one embodiment, the reset signal RST is further generated when the count number NX reaches a phase-shed phase number IX. The phase-shed phase number IX is increased in response to the increase of the load current ISUM of the load 99. Taking the 4-phase power converter as shown in FIG. 4 as an example, when the load current ISUM is lower to an extent, the phase-shed phase number IX will be reduced from 4 (the maximum phase number of the 4-phase power converter) to 3. In this case, the fourth phase sub-converter (i.e. the control circuit 45 and the power stage circuit 40) is shed and ceases switching, and the first, the second the third phase sub-converters (i.e. the control circuit 15, 25, 35 and the power stage circuit 10, 20, 30) keep operating and switching to generate the output power to the load. The phase-shed phase number IX can be further reduced to 2 or 1 according to the level of the load current ISUM.

Figure 5:
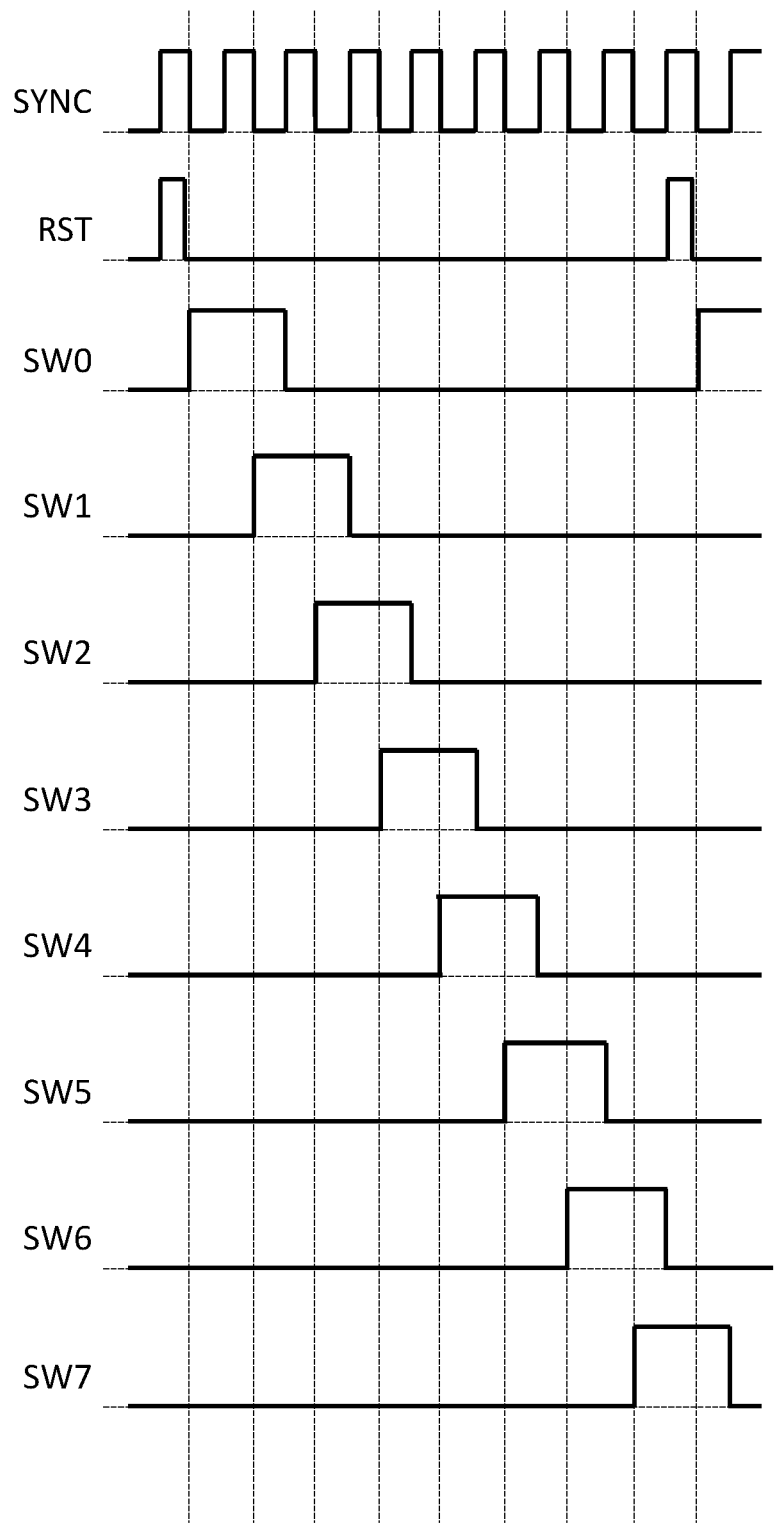
FIG. 5 shows switching waveforms of one preferred embodiment of an 8-phase power converter utilizing the stackable control circuits according to the present invention.

The total phase number (maximum phase) in a stackable multiphase power converter utilizing the stackable control circuits according to the present invention can be any positive integer. FIG. 5 shows switching waveforms of one preferred embodiment of an 8-phase power converter utilizing the stackable control circuits according to the present invention. The 8-phase power converter utilizes 8 control circuits which are configured similar to FIG. 2 with N=8 to control corresponding numbers of power stage circuits to generate the output power to the load. Note that the ON time periods of the multiple-phases switches can be non-overlapped (e.g. SW0-SW3 shown in FIG. 4) or overlapped (e.g. as the voltages SW0-SW7 on the switching node shown in FIG. 5), which is determined according to the feedback control loop of the output power and the corresponding control circuit and the power stage circuit.

In one embodiment, the stackable multiphase power converter (e.g. 102A, 102B in FIG. 2A, FIG. 2B and FIG. 4, or FIG. 5) is a constant on-time (COT) power converter. The multiphase COT power converter (e.g. 102A) is triggered on in response to the pulse of the synchronization signal SYNC. More specifically, in one embodiment, each phase of the sub-converter (i.e. one control circuit collaborating a corresponding power stage circuit) is a constant on-time (COT) power converter, and is triggered on (e.g. the corresponding high side switch of the power stage circuit) in response to the corresponding pulse, correlated to the phase-sequence number SET_N, of the synchronization signal SYNC.

Figure 6:
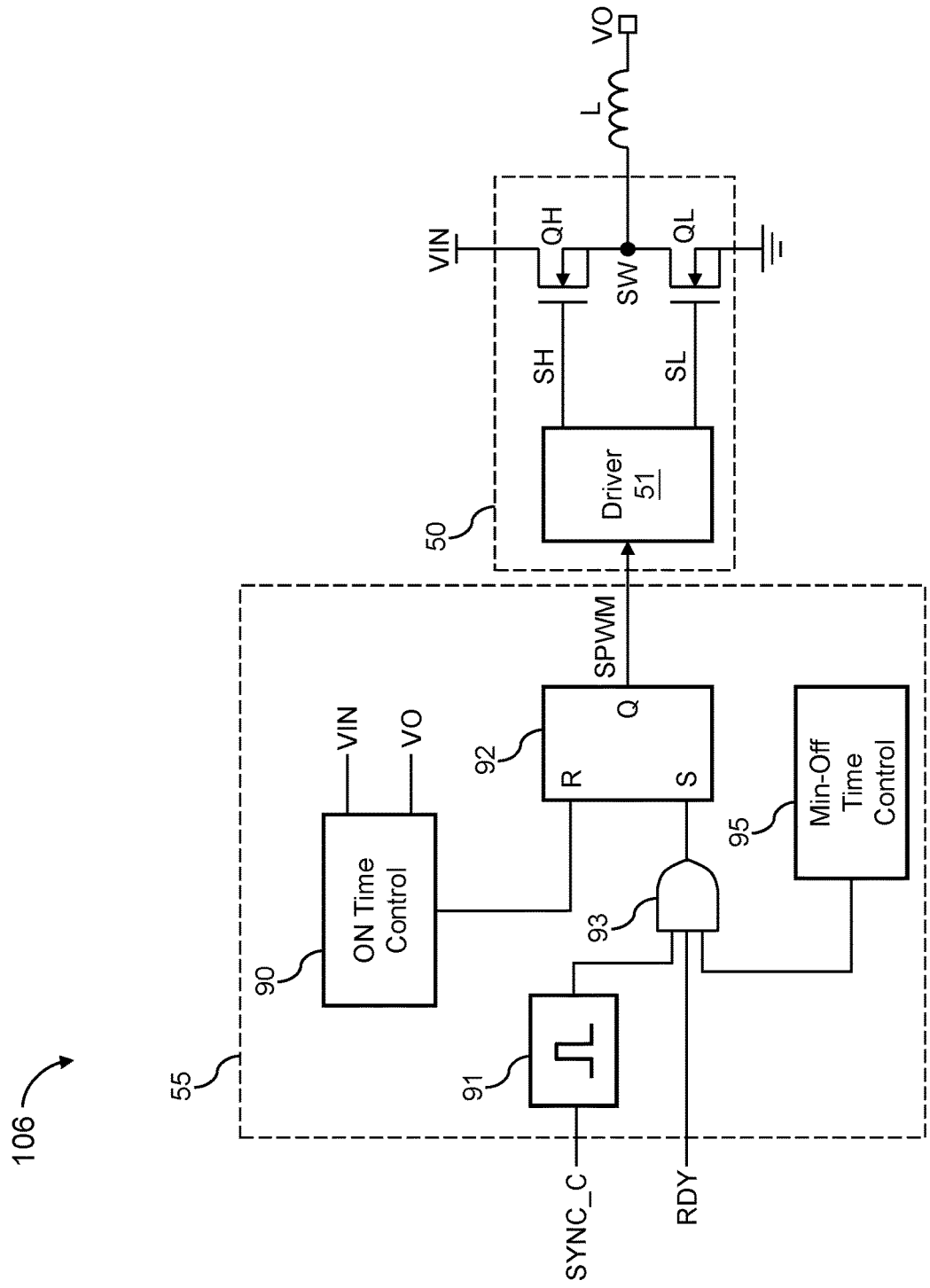
FIG. 6 shows a schematic diagram of a preferred embodiment of the sub-converter and the PWM timing circuit of the stackable multiphase power converter in accordance with the present invention.

FIG. 6 shows a schematic diagram of a preferred embodiment of the sub-converter (106) and the PWM timing circuit (55) of the stackable multiphase power converter in accordance with the present invention. The PWM timing circuit 55 of the control circuit controls the power stage circuit 50. In one embodiment, the PWM timing circuit 55 includes an on-time timer circuit 90 (noted as ON time Control 90), a one-shot pulse generator 91, a latch circuit 92, an AND gate 93 and a minimum off-time timer circuit 95 (noted as Min-Off time control 95).

The on-time timer circuit 90 controls the on-time Ton of the switching signal SW (such as SW0 as shown in FIG. 4) once the PWM control signal SPWM is triggered on (e.g. for controlling the high side switch QH on and controlling the low side switch QL). In one embodiment, the on-time Ton is decreased in response to the increase of the input voltage VIN of the stackable multiphase power converter. In one embodiment, the on-time Ton is increased in response to the increase of the output current of the load 99 for further improving the load transient response. A minimum off-time timer circuit 95 provides a minimum off time for the PWM control signal SPWM (also the switching node signal SW). Once the ready signal RDY is enabled, a sync control signal SYNC_C turns on the high side switch through a one-shot pulse generator 91. The sync control signal SYNC_C is generated in response to the falling edge of the corresponding pulse of the synchronization signal SYNC.

Figure 7:
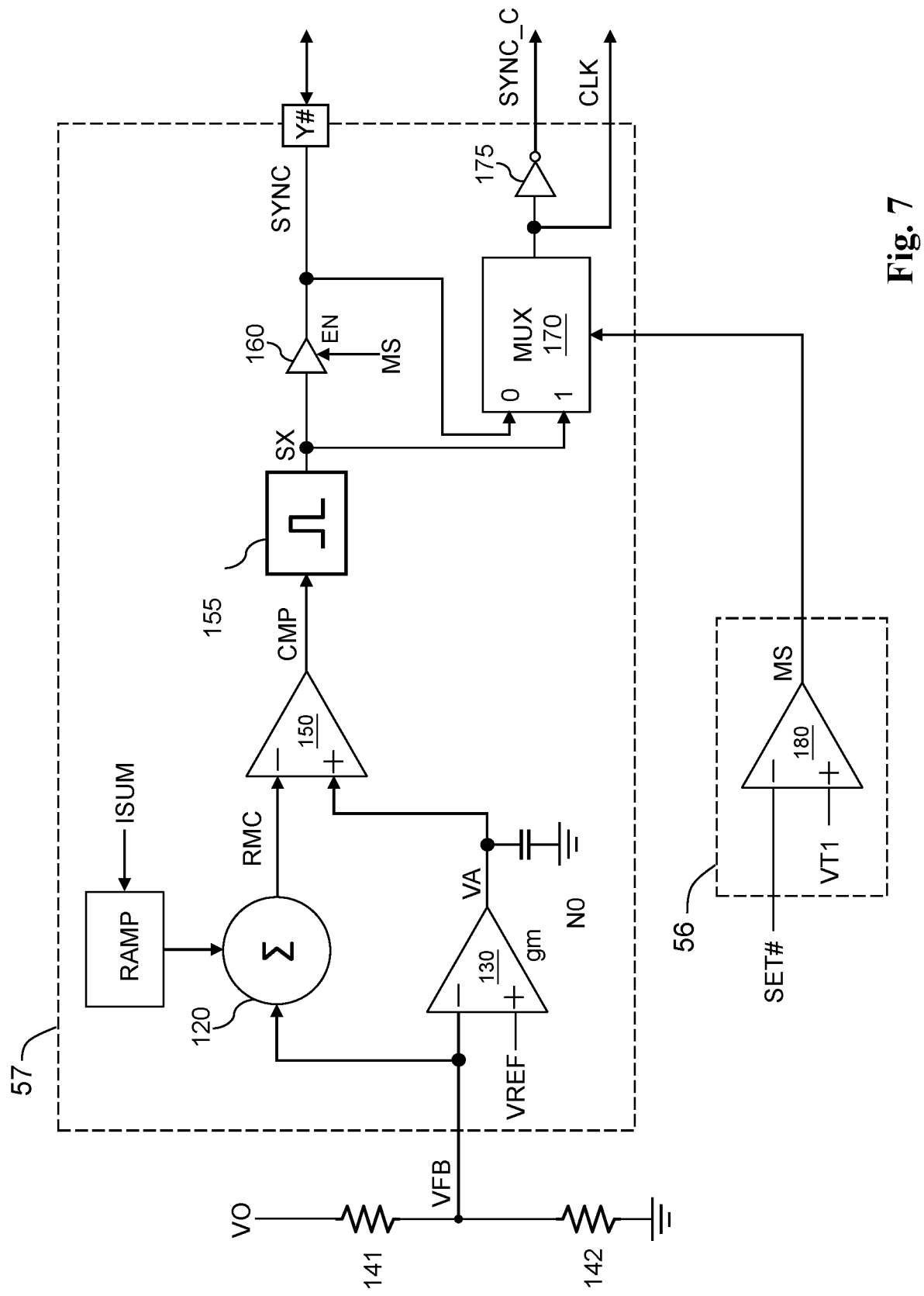
FIG. 7 shows a schematic diagram of a sync circuit for generating the synchronization signal in accordance with a preferred embodiment of the present invention.

FIG. 7 shows a schematic diagram of a sync circuit 57 for generating the synchronization signal SYNC in accordance with a preferred embodiment of the present invention. Resistors 141, 142 form a voltage-divider which generates a feedback voltage VFB in accordance with the output power (e.g. output voltage VO). An error amplifier 130 (e.g. a trans-conductance amplifier) is configured to generate an amplified signal VA by amplifying the difference between a reference voltage VREF and the feedback voltage VFB. The feedback voltage VFB is summed with a ramp signal RAMP to generate a combined ramp signal RMC. The combined ramp signal RMC is coupled to a comparator 150 to compare with the amplified signal VA to generate a comparison signal CMP. In one embodiment, the ramp signal RAMP is generated according to current signal ISUM which is a summation of the inductor currents of all phases of the stackable multiphase power converter.

The comparison signal CMP triggers the one-shot pulse generator 155 to generate a sync-generation signal SX. The sync-generation signal SX is buffered by a buffer 160.

The M/S det. circuit 56 includes a comparator 180 for generating the master signal MS when the voltage of the set-terminal S #is lower than a threshold voltage VT1 (such as 0.5V). When the control circuit is configured as a master circuit, the master signal MS enables the buffer 160 to output the synchronization signal SYNC through the sync terminal Y #. The pulse width of the sync-generation signal SX determines the pulse width of the synchronization signal SYNC.

The synchronization signal SYNC and the sync-generation signal SX are selected by a multiplexer 170 for generating the sync control signal SYNC_C and a clock signal CLK in accordance with the control of the master signal MS. When the control circuit is configured as a slave circuit, the multiplexer 170 selects the synchronization signal SYNC through the sync terminal Y #for generating the sync control signal SYNC_C and the clock signal CLK. The clock signal CLK is related to the rising edge of the synchronization signal SYNC. From one perspective, the clock signal CLK is identical to the synchronization signal SYNC. In one embodiment, when the control circuit is configured as a master circuit, the multiplexer 170 selects the sync-generation signal SX for generating the sync control signal SYNC_C on the sync terminal Y #and also for generating the clock signal CLK.

Figure 8:
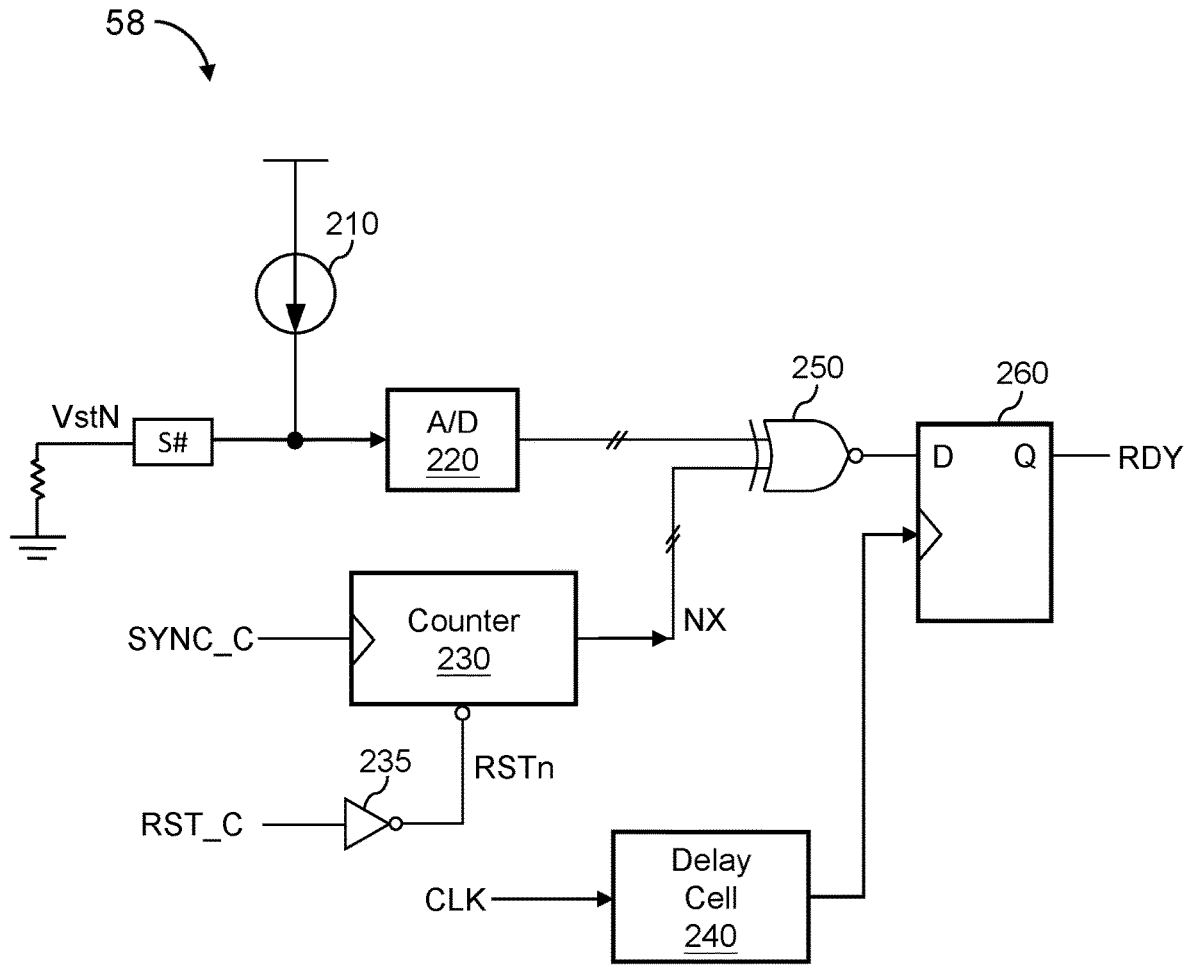
FIG. 8 shows a schematic diagram of a phase enabling circuit which is configured to operably generate the ready signal in accordance with a preferred embodiment of the present invention.

FIG. 8 shows a schematic diagram of a phase enabling circuit 58 which is configured to operably generate the ready signal RDY in accordance with a preferred embodiment of the present invention. In one embodiment, a constant current source 210 outputs a constant current (such as 50 uA) to the set-terminal S #. This constant current and the resistor (e.g. 10k~80k ohm) connected to the set-terminal S #generates a voltage VstN (e.g. 0.5V~4V) for setting the phase-sequence number SET_N. An analog-to-digital converter 220 is connected to the set-terminal S #for converting the voltage VstN to generating the phase-sequence number SET_N (e.g. 0~7, as in the embodiment in FIG. 5). A counter 230 generates the count number NX in response to, for example the rising edge of, the sync control signal SYNC_C. The counter 230 is reset by a reset control signal RST_C. The reset control signal RST_C is generated in response to the reset signal RST. In one embodiment, an inverter is further configured to generate an inverted reset control signal RSTn to reset the counter 230. The count number NX and the phase-sequence number SET_N are compared by a digital comparator 250 (e.g. an XNOR gate) for determining whether the count number NX reaches the phase-sequence number SET_N. A flip-flop 260 is configured to generate the ready signal RDY when the count number NX reaches the phase-sequence number SET_N according to the comparison result of the digital comparator 250. The state of the flip-flop 260 is triggered and latched by the clock signal CLK. In one embodiment, the clock signal CLK is delayed by a delay cell 240 to trigger the flip-flop 260. From a perspective, the ready signal RDY enables the corresponding power stage circuit to generate the output power.

Figure 9:
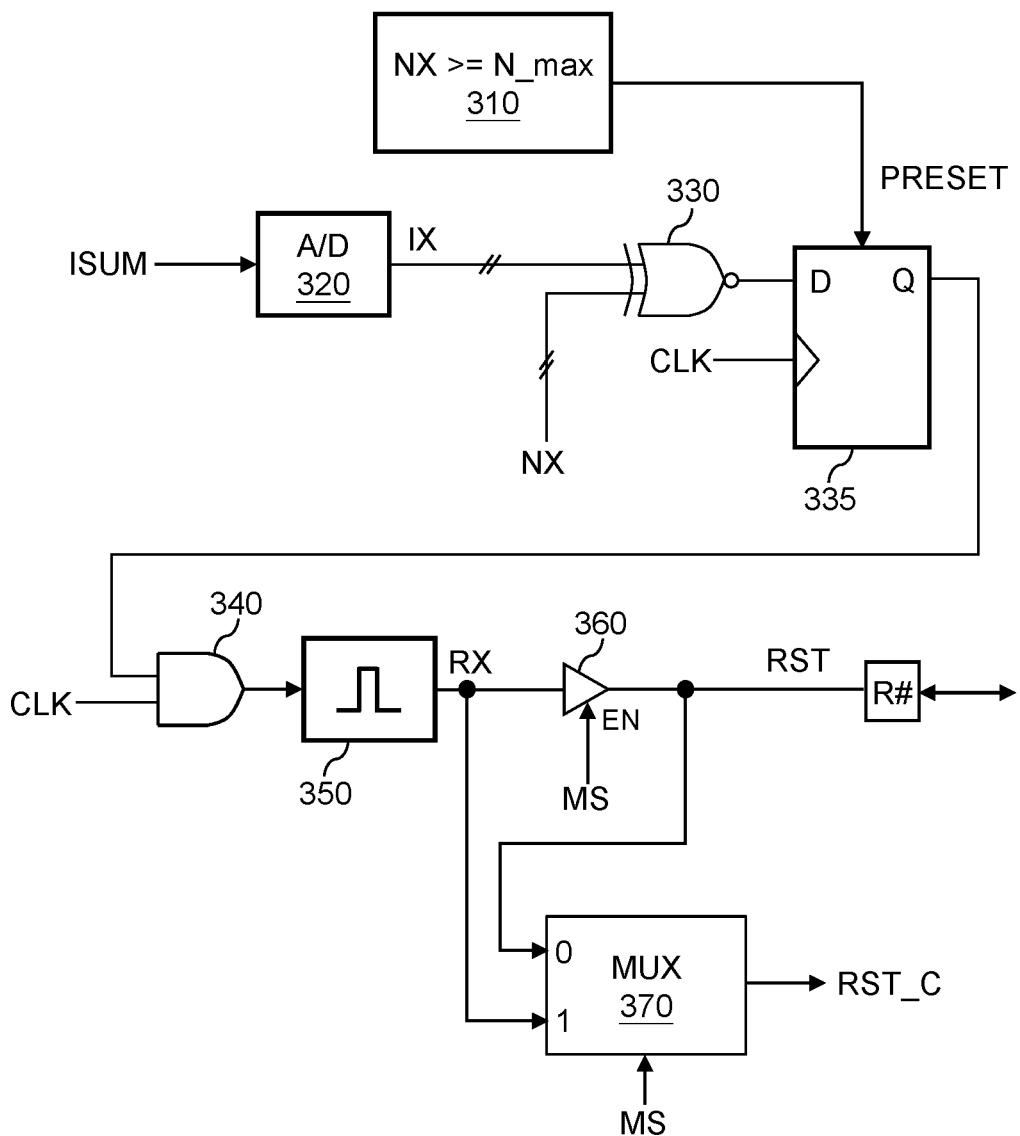
FIG. 9 shows a schematic diagram of a reset circuit for generating the reset signal RST in accordance with a preferred embodiment of the present invention.

FIG. 9 shows a schematic diagram of a reset circuit 59 for generating the reset signal RST in accordance with a preferred embodiment of the present invention. An analog-to-digital converter 320 is configured to convert the load current ISUM to the phase-shed phase number IX. The count number NX and the phase-shed phase number IX are compared by a digital comparator 330 (e.g. an XNOR gate) for determining whether the count number NX reaches the phase-shed phase number IX. In this embodiment, the output of the digital comparator 330 is connected to a flip-flop 335 for generating the reset signal RST once the count number NX reaches the phase-shed phase number IX.

Still referring to FIG. 9, a comparison circuit 310 further sets the flip-flop 335 to generate the reset signal RST when the count number NX reaches a maximum phase number (i.e. N max) of the count number NX. For example, in a 4-phase power converter, the maximum phase number is 4 and the phase-shed phase number IX can be 4, 3, 2 or 1. in a 8-phase power converter, the maximum phase number is 8 and the phase-shed phase number IX can be anyone integer from 1 to 8.

The output of the flip-flop 335 is synchronized with the clock signal CLK to trigger a one-shot pulse generator 350 to generate a reset-generation signal RX. The master signal MS is configured to enable a buffer 360 to output the reset signal RST according to the reset-generation signal RX. The reset signal RST and the reset-generation signal RX are selected by a multiplexer 370 for generating the reset control signal RST_C in accordance with the control of the master signal MS. When the control circuit is configured as a slave circuit, the multiplexer 370 selects the reset signal RST received through the reset terminal R #for generating the reset control signal RST_C. On the other hand, when the control circuit is configured as the master circuit, the multiplexer 370 selects the reset-generation signal RX for generating the reset control signal RST_C on the reset terminal R.

Figure 10:
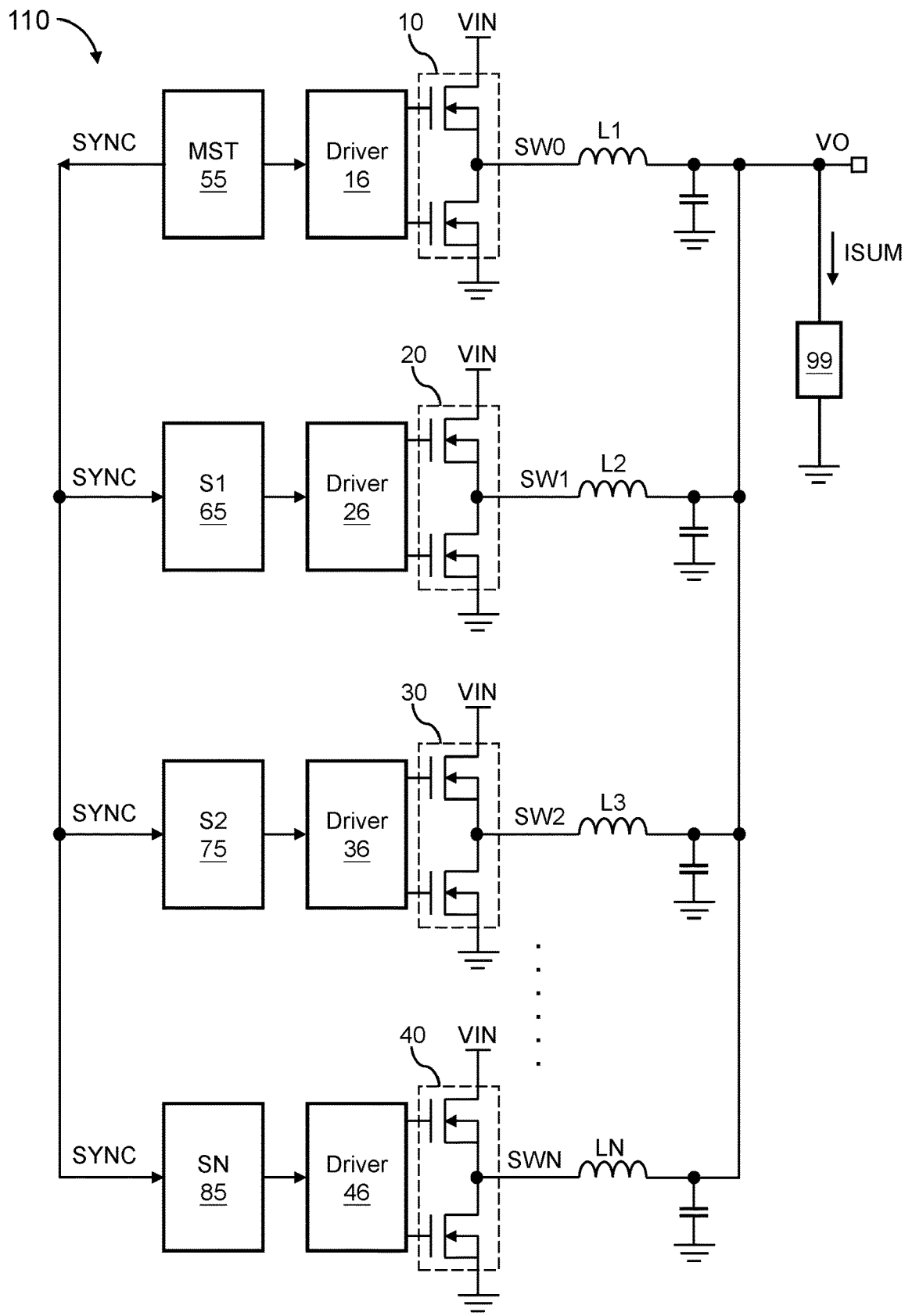
FIG. 10 shows a schematic diagram of the stackable multiphase power converter in accordance with another preferred embodiment of the present invention.

FIG. 10 shows a schematic diagram of the stackable multiphase power converter in accordance with another preferred embodiment of the present invention. The stackable multiphase power converter 110 in FIG. 10 is similar to stackable multiphase power converter 102B in FIG. 2B and differs in that the control circuits (e.g. 55, 65, 75, 85) of the stackable multiphase power converter 110 do not include a dedicated reset terminal. In this embodiment, the reset control signal RST_C' is alternatively generated in accordance with the synchronization signal SYNC. The reset control signal RST_C' is configured to reset and initiate the count number NX in every multiphase cycle, which achieves the same operations provided by the reset signal RST and the corresponding reset control signal RST_C of the aforementioned embodiments (e.g. FIG. 3, FIG. 8).

Figure 11:
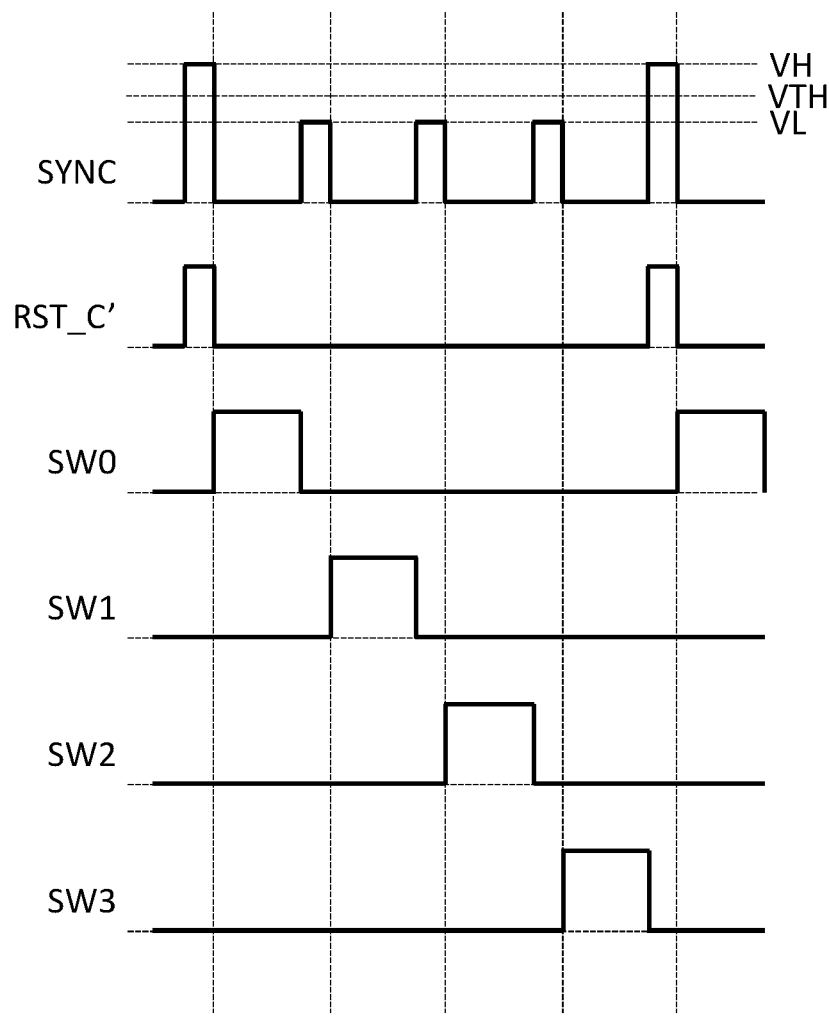
FIG. 11 shows a 4-phases switching waveforms of the control circuit shown in FIG. 10 according to the preferred embodiment of the present invention.

FIG. 11 shows a 4-phases switching waveforms of the control circuit shown in FIG. 10 according to the preferred embodiment of the present invention. In this embodiment, the synchronization signal SYNC includes a plurality of pulses to successively generate a count number NX in the control circuits. The control circuit enables the corresponding stackable power stage circuit to generate the output power to the load 99 when the count number NX is correlated to the phase-sequence number SET_N (i.e. the ready signal RDY is enabled). In this embodiment, the reset control signal RST_C' (can also be referred to as the reset signal in this embodiment) is configured to reset and initiate the count number NX. As shown in FIG. 11, in this embodiment, a high voltage-level pulse (such as VH) of the synchronization signal SYNC represents the reset signal. Other pulses of the synchronization signal SYNC can be at low voltage-level (such as VL). From one perspective, the reset signal in this embodiment is modulated, or mixed in the pulses of the synchronization signal SYNC. The reset control signal RST_C' is generated when the voltage level of the synchronization signal SYNC is higher than a threshold VTH.

Figure 12:
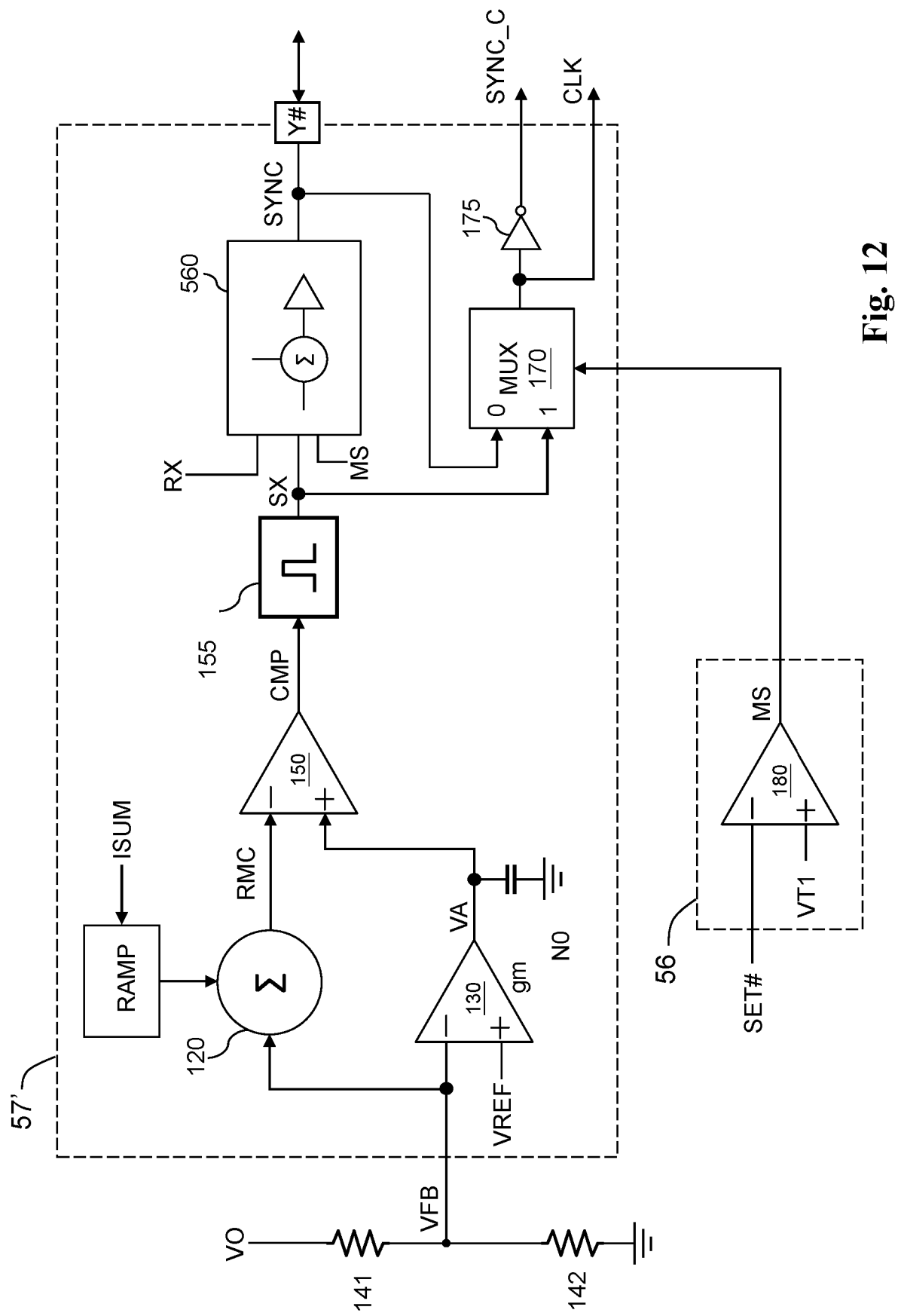
FIG. 12 shows a schematic diagram of a sync circuit for generating the synchronization signal mixed with the reset signal according to a preferred embodiment of the present invention corresponding to FIG. 10 and FIG. 11.

FIG. 12 shows a schematic diagram of a sync circuit 57' for generating the synchronization signal SYNC mixed with the reset signal according to a preferred embodiment of the present invention corresponding to FIG. 10 and FIG. 11. The operation of the sync circuit 57' is similar to the operation of the sync circuit 57 shown in FIG. 7. In this embodiment, the sync circuit 57' further includes a pulse-mixer 560 which is configured to generate the synchronization signal SYNC by summing the sync-generation signal SX with the reset-generation signal RX, such that the reset signal in this embodiment is modulated, or mixed in the pulses of the synchronization signal SYNC.

Figure 13:
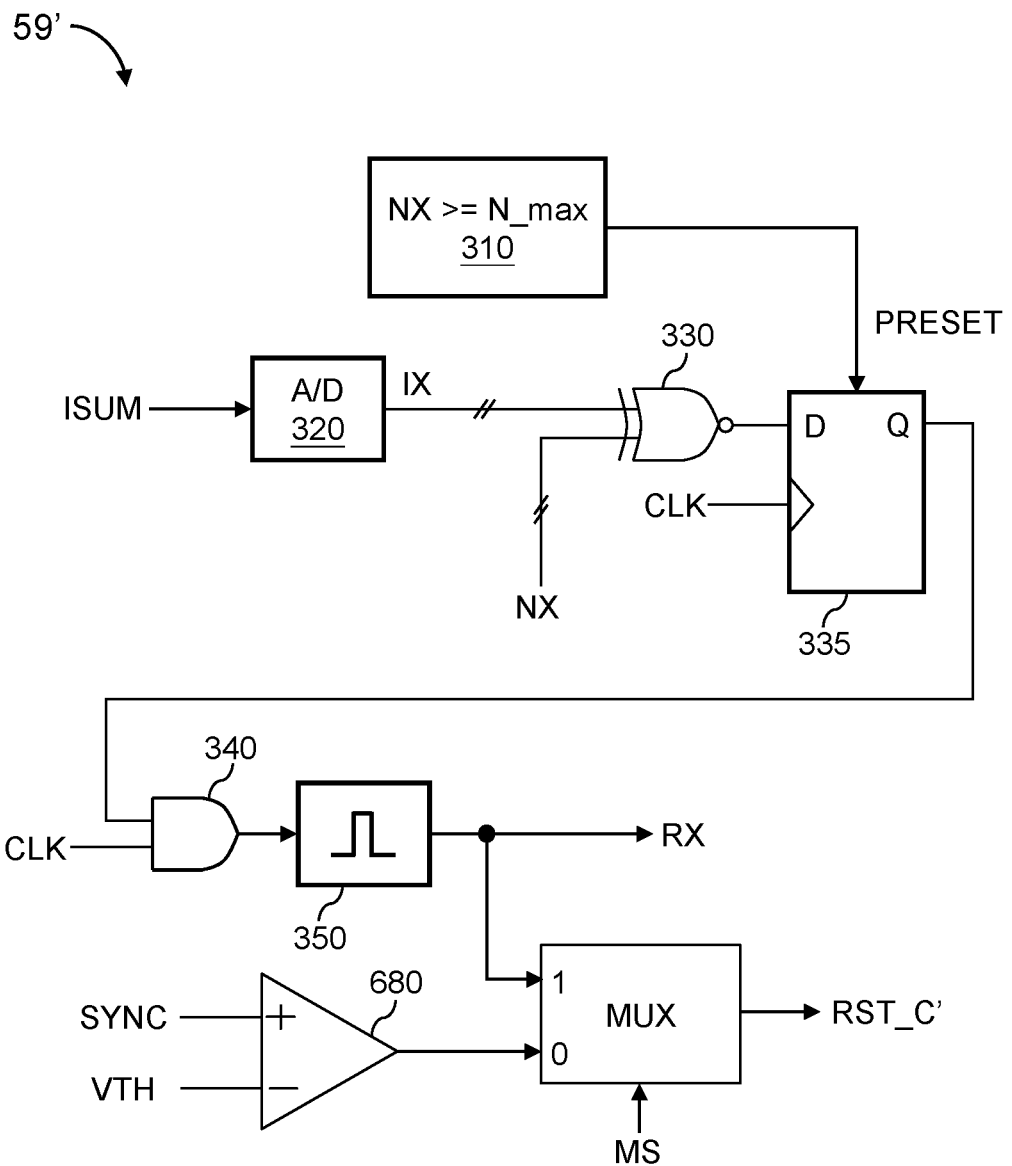
FIG. 13 shows a schematic diagram of a reset circuit 59' for generating the reset control signal in accordance with a preferred embodiment of the present invention corresponding to FIG. 10, FIG. 11 and FIG. 12.

FIG. 13 shows a schematic diagram of a reset circuit 59' for generating the reset control signal RST_C' in accordance with a preferred embodiment of the present invention corresponding to FIG. 10, FIG. 11 and FIG. 12. The operation of the reset circuit 59' is similar to the operation of the reset circuit 59 shown in FIG. 9. In this embodiment, the reset circuit 59' further includes a comparator 680 which is configured to receive the synchronization signal SYNC for generating the reset control signal RST_C' when the control circuit is configured as a slave circuit. The reset control signal RST_C' is generated when the voltage level of the synchronization signal SYNC is higher than a threshold VTH.

Figure 14:
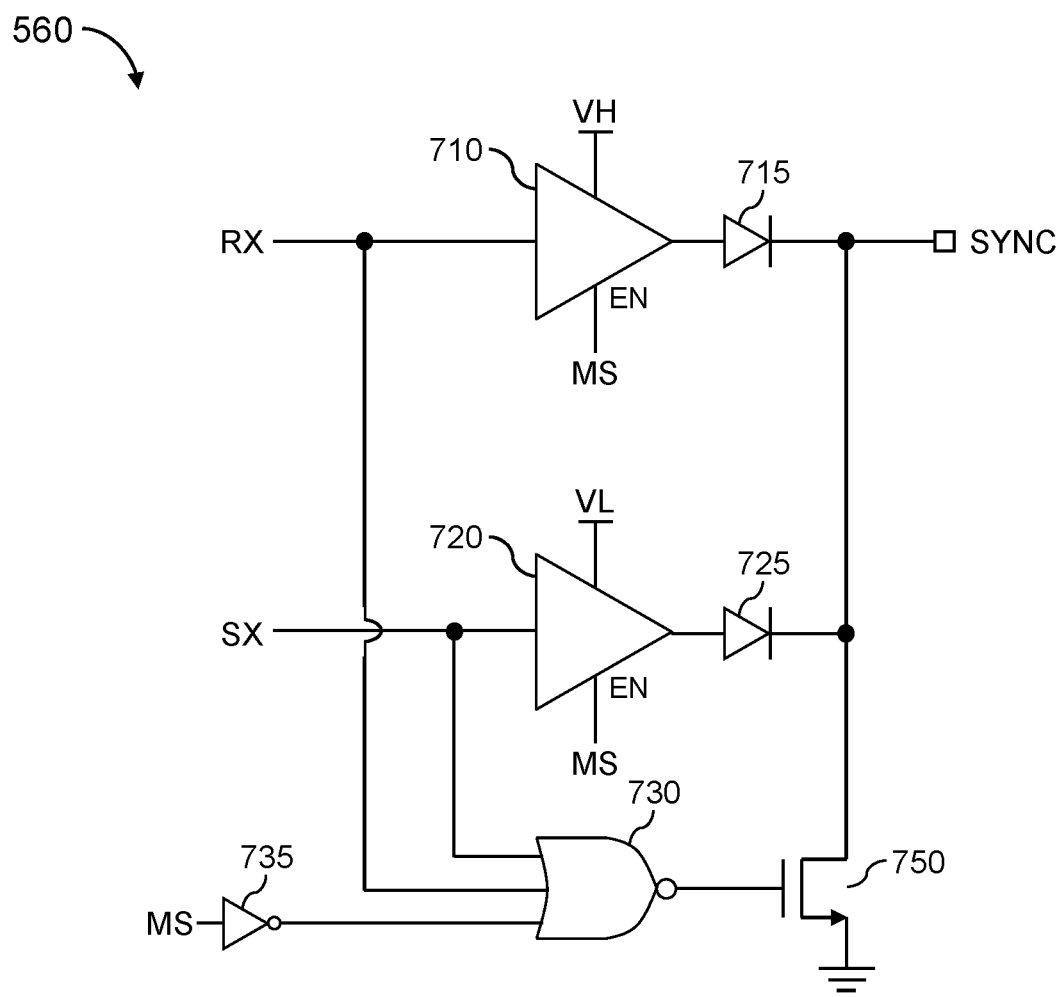
FIG. 14 shows a schematic diagram of the pulse-mixer of the sync circuit in accordance with a preferred embodiment of the present invention corresponding to FIG. 10, FIG. 11 and FIG. 12

FIG. 14 shows a schematic diagram of the pulse-mixer 560 of the sync circuit 57' in accordance with a preferred embodiment of the present invention corresponding to FIG. 10, FIG. 11 and FIG. 12.

In one embodiment, when the control circuit is configured as the master circuit, the master signal MS enables buffers 710 and 720, and the transistor 750 is turned on to provide a resistive load for biasing the multiplexer formed by the diodes 715 and 725, wherein the on-resistance of the transistor 750 can be configured relatively high to keep high accuracy of the voltage levels of the pulses of the synchronization signal SYNC. The buffer 710 receives the reset-generation signal RX to generate the high-level pulses of the synchronization signal SYNC. The buffer 720 receives the sync-generation signal SX to generate the low voltage-level pulses of the synchronization signal SYNC. The diodes 715 and 725 are configured as a multiplexer which automatically selects a buffer output, of the buffers 710 and 720, having a higher voltage to generate the synchronization signal SYNC. In one embodiment, the power source (VH) of the buffer 710 is higher than the power source (VL) of the buffer 720.

On the other hand, when the control circuit is configured as a slave circuit, the master signal MS disables the buffers 710 and 720, and transistor 750 is turned off, such that the terminal for generating the synchronization signal SYNC of the pulse-mixer 560 is at a high impedance state.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A control circuit for use in controlling a stackable multiphase power converter, wherein the stackable multiphase power converter includes plural power stage circuits and a corresponding number of a plurality of the control circuits, wherein the plural power stage circuits are coupled in parallel to generate an output power to a load, wherein each of the power stage circuits includes at least one switch for controlling an inductor, wherein each of the control circuits is coupled to the corresponding one of the power stage circuits, the control circuit comprising:
   a synchronization terminal;
   a synchronization signal, configured to be connected to the synchronization terminals, in parallel, corresponding to the plurality of control circuits, wherein the synchronization signal includes a plurality of pulses to be successively counted as a count number; and
   a reset signal, configured to reset and initiate the count number;
   wherein the control circuit further comprises a phase-sequence number, wherein the control circuit enables the corresponding power stage circuit to generate the output power when the count number is correlated to the phase-sequence number.

2. The control circuit as claimed in claim 1, further comprising a set-terminal for setting the phase-sequence number, wherein the phase-sequence number is determined according to an electrical parameter level on the set-terminal.

3. The control circuit as claimed in claim 1, wherein the control circuit further determines to operate as a master circuit or a slave circuit according to the phase-sequence number;
   wherein the master circuit generates the synchronization signal through the synchronization terminal and the slave circuit is coupled to receive the synchronization signal through the synchronization terminal;
   wherein the master circuit generates the reset signal, wherein and the slave circuit is coupled to receive the reset signal.

4. The control circuit as claimed in claim 1, further comprising a counter, configured to successively count the pulses of the synchronization signal to generate the count number; wherein the reset signal is generated when the count number reaches than a maximum number.

5. The control circuit as claimed in claim 1, wherein the reset signal is generated when the count number reaches a phase-shed phase number, wherein the phase-shed phase number is increased in response to the increase of the current of the load.

6. The control circuit as claimed in claim 3, the control circuit comprising:
a sync circuit, configured to operably generate the synchronization signal through the synchronization terminal when the control circuit is configured as the master circuit, and receive the synchronization signal through the synchronization terminal when the control circuit is configured as the slave circuit.

7. The control circuit as claimed in claim 3, the control circuit further comprising:
a reset terminal, wherein the reset signal is connected to the reset terminals, in parallel, corresponding to the plurality of control circuits; and
a reset circuit, configured to operably generate the reset signal through the reset terminal when the control circuit is configured as the master circuit, and receive the reset signal when the control circuit is configured as the slave circuit.

8. The control circuit as claimed in claim 7, wherein a pulse width of the reset signal is shorter than a pulse width of the synchronization signal.

9. The control circuit as claimed in claim 1, wherein a pulse having a higher voltage level of the synchronization signal represents the reset signal.

10. The control circuit as claimed in claim 1, wherein the power stage circuit is a constant on-time (COT) power converter; the COT power converter is triggered on in response to the pulse of the synchronization signal.

11. The control circuit as claimed in claim 1, the control circuit further comprising a constant current source which is coupled to a resistor through the set-terminal, wherein the phase-sequence number is determined according to a voltage level of the set-terminal.

12. The control circuit as claimed in claim 1, wherein the control circuit is configured as an integrated circuit and the synchronization terminal corresponds to a synchronization pin of the integrated circuit.

13. A method for controlling a stackable multiphase power converter, wherein the stackable multiphase power converter includes plural power stage circuits and a corresponding number of a plurality of controllers, wherein the plural power stage circuits are coupled in parallel to generate an output power to a load, wherein each of the power stage circuits includes at least one switch for controlling an inductor, wherein each of the controllers is coupled to the corresponding one of the power stage circuits, the method comprising:
generating a synchronization signal connected to the controllers of stackable multiphase power converter in parallel without the daisy chain configuration;
generating a reset signal in accordance with the synchronization signal;
wherein each of the controller includes a phase-sequence number, wherein the synchronization signal includes a plurality of pulses to successively generate a count number, wherein the controller enables the corresponding stackable multiphase power converter to generate the output power to the load when the count number is correlated to the phase-sequence number, wherein the reset signal is coupled to reset and initiate the count number.

14. The method as claimed in claim 13, wherein a higher voltage-level pulse of the synchronization signal represents the reset signal.

15. The method as claimed in claim 13, further comprising: generating the phase-sequence number through a set-terminal; the phase-sequence number is determined according to the voltage level at the set-terminal.

16. The method as claimed in claim 13, wherein the phase-sequence number further determines the controller as a master or a slave, wherein the master generates the synchronization signal, wherein the slave is configured to receive the synchronization signal.

17. The method as claimed in claim 13, wherein the reset signal is enabled when the count number reaches than a maximum number.

18. The method as claimed in claim 13, wherein the reset signal is enabled when the count number reaches a phase-shed phase number, wherein the phase-shed phase number is generated and increased in response to the increase of the output current of the load.

19. The method as claimed in claim 13, wherein the stackable multiphase power converter is a constant on-time (COT) power converter, wherein the COT power converter is triggered on in response to the pulse of the synchronization signal.

* * * * *